(12) United States Patent
Imai

(10) Patent No.: US 8,934,050 B2
(45) Date of Patent: Jan. 13, 2015

(54) USER INTERFACE AND METHOD FOR EXPOSURE ADJUSTMENT IN AN IMAGE CAPTURING DEVICE

(75) Inventor: Francisco Imai, Mountain View, CA (US)

(73) Assignee: Canon Kabushiki Kaisha, Tokyo (JP)

(*) Notice: Subject to any disclaimer, the term of this patent is extended or adjusted under 35 U.S.C. 154(b) by 403 days.

(21) Appl. No.: 12/789,323

(22) Filed: May 27, 2010

(65) Prior Publication Data

US 2011/0292242 A1    Dec. 1, 2011

(51) Int. Cl.
*G03B 7/00*     (2014.01)
*H04N 5/235*   (2006.01)
*H04N 5/232*   (2006.01)

(52) U.S. Cl.
CPC .......... *H04N 5/23293* (2013.01); *H04N 5/235* (2013.01); *H04N 5/23216* (2013.01)
USPC ................. 348/362; 348/333.02; 348/333.11; 396/222; 396/238

(58) Field of Classification Search
USPC ..................... 348/333.02, 229.1, 362, 333.11; 396/222, 238
See application file for complete search history.

(56) References Cited

U.S. PATENT DOCUMENTS

| | | | |
|---|---|---|---|
| 7,649,564 B2 * | 1/2010 | Suekane et al. | 348/333.02 |
| 2002/0012064 A1 | 1/2002 | Yamaguchi | |
| 2002/0141639 A1 | 10/2002 | Steinberg | |
| 2003/0016299 A1 | 1/2003 | Matsushima | |
| 2004/0017594 A1 | 1/2004 | Suekane | |
| 2004/0125220 A1 | 7/2004 | Fukuda | |
| 2004/0189856 A1 * | 9/2004 | Tanaka | 348/345 |
| 2005/0094891 A1 * | 5/2005 | Stavely et al. | 382/274 |
| 2005/0134722 A1 | 6/2005 | Hofer | |
| 2005/0270397 A1 | 12/2005 | Battles | |
| 2006/0007346 A1 * | 1/2006 | Nakamura et al. | 348/362 |
| 2006/0140510 A1 | 6/2006 | Wallace | |
| 2007/0206108 A1 | 9/2007 | Nozawa | |
| 2007/0291152 A1 | 12/2007 | Suekane | |
| 2008/0303913 A1 * | 12/2008 | Mertens | 348/222.1 |
| 2010/0044822 A1 | 2/2010 | Longoni | |
| 2010/0066858 A1 * | 3/2010 | Asoma | 348/229.1 |

* cited by examiner

*Primary Examiner* — Paul Berardesca
(74) *Attorney, Agent, or Firm* — Canon U.S.A., Inc., IP Division

(57) ABSTRACT

An image-capturing device and associated method for selective exposure adjustment of an image, wherein, image data of a scene is acquired, the scene is displayed on d display unit, the scene is divided into a plurality of regions, and a level of exposure is chosen for at least one region from the plurality of regions.

19 Claims, 6 Drawing Sheets

USER INTERFACE AND METHOD FOR EXPOSURE ADJUSTMENT IN AN IMAGE CAPTURING DEVICE

BACKGROUND OF THE INVENTION

1. Field of the Invention

The present invention relates to a user interface and method for dynamic range adjustment for an image capturing device.

2. Description of the Related Art

Dynamic range is typically defined as the ratio between the maximum and minimum values of physical measurement. In the world of photography and image processing, dynamic range is the ratio of saturation to noise. More specifically, the ratio of the intensity that just saturates the camera to the intensity that just moves the camera response one standard deviation above camera noise. And, even more specifically, dynamic range represents the ratio of two luminance values.

The human visual system has a relatively large dynamic range. For example, human vision can typically see objects in starlight or in bright sunlight and can adjust relatively well to scenes with very dark and bright areas. Typical photo-detectors on the other hand have a much more limited range of luminance data that they can capture. The linear response of these sensors imposes an abrupt limit to the dynamic range captured once the sensor capacity has been reached.

Digital images that have shadows and highlights and are captured using these photo-detectors require exposure adjustment of either the shadows, highlights, or both. This can lead to improper exposure of areas of the image, which can result in a poor level of detail in those areas due to excessive noise level or saturation.

This is why you cannot get what the human eye is seeing when capturing a high dynamic range scene with a standard camera. If you capture details in the shadows due to long exposure times, blown-out highlights result. Conversely, details in the highlights can be captured with short exposure times, but then contrast in the shadows is lost.

Currently, there is a trend in the area of digital photography to try and increase the current limitations of dynamic range. One approach has been to develop high dynamic range imaging sensors. However, these sensors have mainly been developed for the military, security, and other similar applications, and have yet to make their way into mainstream consumer level digital cameras. The majority of consumer level digital cameras still rely on conventional CMOS and CCD imaging sensors, which have limited dynamic range.

Photographers have been relying on multiple imaging capture to increase the dynamic range of digital photographs captured with such cameras. In this method, differently exposed photographs of the same scene are merged into an image with details in both highlights and shadows. This is known as exposure bracketing or blending. The exposure bracketing consists not on uniform steps of exposure but exposures corresponding to the exposures calculated based on brightness histogram adjustments by the user. This is accomplished using various commercially available post-processing software applications.

Once the high-dynamic image is captured there is the additional problem of the fact that most displays are unable to display high-dynamic range images. Therefore, the captured high-dynamic range image has to be processed, in a method known as tone mapping, the tonal range of a high dynamic range image of a scene is compressed in order to obtain its details in highlights and shadows. The initial image is either generated from differently exposed photos or obtained using a high dynamic range camera, as previously discussed.

In light of the above, what is needed is a method for easily specifying automatic exposure(s) based on manual user region selections and degree of visibility desirable for each region on commonly available digital cameras at the time an image is captured.

SUMMARY OF THE INVENTION

To solve the aforementioned issue, the present invention provides a method for easily specifying automatic exposure (s) based on manual user region selections and degree of visibility desirable for each region on commonly available digital cameras at the time an image is captured.

According to an aspect of the present invention, a method for selective exposure adjustments on an image-capturing device, the method includes displaying a scene to be captured by the image-capturing device on a display unit, dividing the scene displayed into a plurality of regions, selecting a region from the plurality of regions, adjusting an exposure value of the selected region, calculating the number of image captures required to encompass the adjusted exposure value, wherein the calculation is based on the image-capturing device's default dynamic range value, and capturing the scene.

Further aspects and features of the present invention will become apparent from the following description of exemplary embodiments (with reference to the attached drawings).

DETAILED DESCRIPTION OF EXEMPLARY EMBODIMENTS

Figure 1:
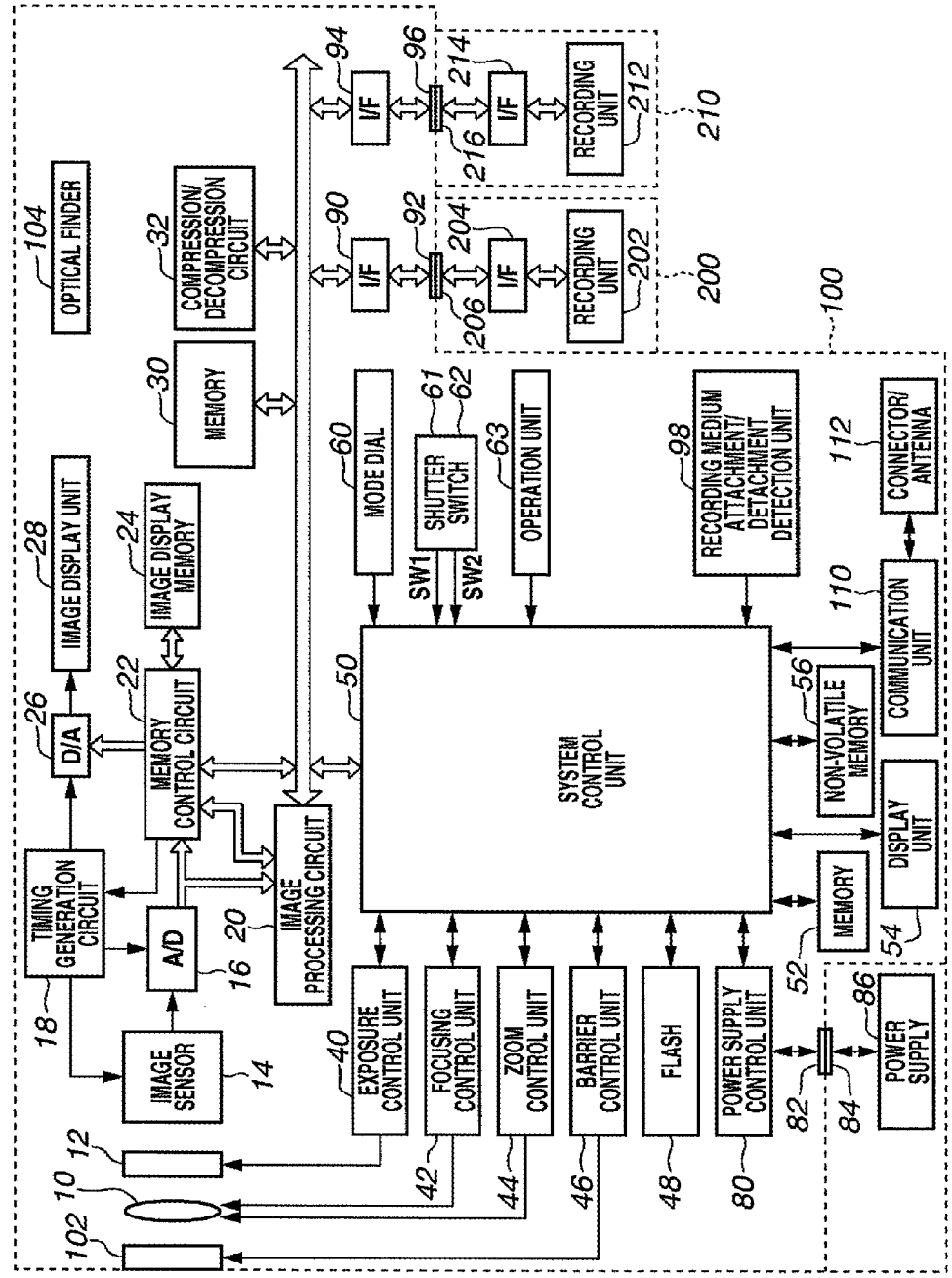
FIG. 1 is a representational view illustrating a general configuration of an image-capturing device.

FIG. 1 is a representational view illustrating a general configuration of an imaging apparatus according to an exemplary embodiment.

An imaging apparatus 100 includes a protection unit 102, photographic lens 10, a shutter 12, an image sensor 14, an analog to digital (A/D) converter 16, a timing generation circuit 18, and an image processing circuit 20. The protection unit 102 serves as a cover to protect an imaging unit including the photographic lens 10 from soiling and breakage. The shutter 12 includes a diaphragm function. The image sensor 14 converts an optical image to electric signals. The A/D converter 16 coverts an analog signal output from the image sensor 14 to a digital signal. The timing generation circuit 18 supplies a clock signal and a control signal to the image sensor 14, the A/D converter 16, and a digital to analog (D/A)

converter 26. The timing generation circuit 18 is controlled by a memory control circuit 22 and a system control unit 50.

The image processing circuit 20 performs predetermined pixel interpolation and color conversion on data received from the A/D converter 16 or the memory control circuit 22. Further, the image processing circuit 20 performs a predetermined calculation using the captured image data. Furthermore, the image processing circuit 20 performs a predetermined calculation using the captured image data and through-the-lens (TTL) auto-white balance (AWB) processing based on the calculation result. In white balance processing, block integration is performed by dividing a video signal into a plurality of blocks and acquiring an integration value of a color signal for each block to calculate the white balance. Further, white search integration is performed by converting a signal value of each pixel in the video signal onto a chromaticity coordinate and acquiring an integration value of the color signal for a predetermined region. A setting of an integration region on the chromaticity coordinate which is used in the white search integration is stored in the image processing circuit 20.

The imaging apparatus 100 further includes the memory control circuit 22, an image display memory 24, the D/A converter 26, and an image display unit 28.

The memory control circuit 22 controls the A/D converter 16, the timing generation circuit 18, the image processing circuit 20, the D/A converter 26, a memory 30 and a compression/decompression circuit 32. The data of the A/D converter 16 is written in the image display memory 24 or the memory 30 via the image processing circuit 20 and the memory control circuit 22, or via the memory control circuit 22.

The image display unit 28 is, for example, a thin-film transistor (TFT) liquid crystal display (LCD). Image data for display which is written in the image display memory 24 is displayed on the image display unit 28 via the D/A converter 26. An electronic finder function can be implemented by sequentially displaying the captured image data using the image display unit 28. Further, the image display unit 28 can arbitrarily switch a display screen on and off according to an instruction from a system control unit 50. If the image display unit 28 turns off the display, power consumption of the imaging apparatus 100 can be greatly reduced.

The imaging apparatus 100 further includes the memory 30, the compression/decompression circuit 32, an exposure control unit 40, a focusing control unit 42, a zoom control unit 44, a barrier control unit 46, a flash unit 48, and the system control unit 50.

The memory 30 stores captured still images and moving images. The memory 30 has a storage capacity large enough to store a predetermined number of still images and a moving image corresponding to a predetermined period of time. Therefore, a large amount of image data can be written in the memory 30 at high speed in both a continuous shooting mode of continuously shooting a plurality of still images and a panorama shooting mode. Further, the memory 30 can be used as a work area of the system control unit 50.

The compression/decompression circuit 32 compresses and decompresses the image data using adaptive discrete cosine transform (ADCT). The compression/decompression circuit 32 reads an image stored in the memory 30 and compresses or decompresses the image, and writes the processed data in the memory 30.

The system control unit 50 controls the entire imaging apparatus 100. The exposure control unit 40 controls the shutter 12 which includes the diaphragm function. Further, the exposure control unit 40 includes a flash light amount control function in cooperation with the flash unit 48. The focusing control unit 42 controls focusing of the photographic lens 10. The exposure control unit 40 and the focusing control unit 42 are controlled by a TTL system.

More specifically, the system control unit 50 performs auto-focus (AF) processing, automatic exposure (AE) processing, and electronic flash pre-emission (EF) processing according to the TTL system by controlling the exposure control unit 40 and the focusing control unit 42 based on a calculation result obtained by the image processing unit 20. The zoom control unit 44 controls zooming of the photographic lens 10. The barrier control unit 46 controls an operation of the protection unit 102. The flash unit 48 includes a function of emitting AF auxiliary light and the light amount control function.

Moreover, the imaging apparatus 100 includes a memory 52, a display unit 54, and a non-volatile memory 56.

The memory 52 stores constants, variables, and programs to be used in operations of the system control unit 50. Further, the memory 52 stores a program diagram to be used in the AE processing. The program diagram is a table which defines a relationship between an aperture diaphragm diameter corresponding to an exposure value and a control value of shutter speed.

The display unit 54 may include an LCD or a speaker which displays an operation state or a message using characters, images, and sound according to execution of a program by the system control unit 50. One display unit 54 or a plurality of display units 54 may be provided near an operation unit 63 of the imaging apparatus 100 so that it is easily visible for a user. The display unit 54 may be configured as a combination of an LCD, a light-emitting diode (LED), and a sound generator. A part of the functions of the display unit 54 is installed within an optical finder 104.

Display contents of the display unit 54 which are displayed on the LCD may include indications of single shot/continuous shooting, self timer, a compression rate, a number of recorded pixels, a number of recorded shots, a remaining number of shots, a shutter speed, an aperture value, and exposure correction. Further, the display unit 54 may display on the LCD, indications such as, flash, red-eye reduction, macro shooting, buzzer setting, remaining amount of a clock battery, remaining amount of batteries, error information, information in a plurality of digits, a detached/attached state of a recording medium, a communication interface operation, and date and time.

The display contents of the display unit 54 which are displayed in the optical finder 104 may include indications of in-focus, camera-shake warning, flash charge, shutter speed, aperture value, and exposure correction.

The non-volatile memory 56 is an electrically erasable and recordable memory such as an electrically erasable programmable read-only memory (EEPROM).

The imaging apparatus 100 further includes a mode dial 60, a shutter switch (SW1) 61, a shutter switch (SW2) 62, and the operation unit 63 which are input units for a user to input various operation instructions to the system control unit 50. Such input units are configured with a single device such as a switch, a dial, a touch panel, pointing using line-of-sight detection, and a speech recognition apparatus or a combination of a plurality of these devices.

The mode dial 60 can be used to specify switching between functional modes such as power off, automatic shooting mode, shooting mode, panoramic shooting mode, reproduction mode, multiple screen reproducing/erasing mode, and personal computer (PC) connection mode.

The shutter switch (SW1) 61 is switched on by a half stroke of a shutter button (not illustrated) and instructs start of AF processing, AE processing, AWB processing, and EF processing.

The shutter switch (SW2) 62 is switched on by a full stroke of the shutter button (not illustrated) and instructs start of a series of processing. The series of processing include exposure processing to write signals read from the image sensor 14 into the memory 30 via the A/D converter 16 and the memory control circuit 22, developing processing employing calculations performed by the image processing circuit 20 and the memory control circuit 22, and recording processing. In the recording processing, the image data read from the memory 30 is compressed by the compression/decompression circuit 32 and then written into the recording media 200 and 210.

The operation unit 63 includes various buttons and touch panels, such as a menu button, a set button, a macro selection button, a multi-screen reproduction and page-advance button, a flash setting button, and a single-shot/serial-shot/self-timer selection button. Further, the operation unit 63 includes a forward (+) menu item selection button, a backward (−) menu item selection button, a forward (+) reproduction image search button, a backward (−) reproduction image search button, a shooting quality selection button, an exposure correction button, and a date/time set button.

The imaging apparatus 100 further includes a power supply control unit 80, connectors 82 and 84, a power supply 86, interfaces 90 and 94, the optical finder 104, a communication unit 110, a connector (antenna) 112, and a recording medium attachment/detachment state detection unit 98.

The power supply control unit 80 includes a battery detection circuit, a direct current (DC)—DC converter, and a switch circuit for switching the blocks to be energized. The power supply control unit 80 detects the attached/detached state of the battery, a battery type and the remaining battery power level, and controls the DC-DC converter based on the detection result and an instruction from the system controller 50. The power supply control unit 80 then supplies a necessary voltage for a necessary period to each of the units including the recording medium. The power supply 86 may include a primary battery such as an alkaline battery or a lithium battery, a secondary battery such as a BNiCd battery, an NiMH battery, or an Li battery, and an alternate current (AC) adapter.

Interfaces 90 and 94 transmit and receive data to and from the recording media 200 and 210 such as a memory card or a hard disk. The connectors 92 and 96 connect the imaging apparatus 100 and the recording media 200 and 210. The recording medium attachment/detachment detection unit 98 detects whether the recording medium 200 or the recording medium 210 is connected to the connector 92 or the connector 96. The present exemplary embodiment describes a case where there are two systems of interfaces and connectors for attaching the recording medium. However, there can be any number of systems of interfaces and connectors for attaching the recording medium. Further, interfaces and connectors pursuant to different standards may be combined.

Cards in conformity with Personal Computer Memory Card International Association standards (PCMCIA cards) or cards in conformity with compact flash (CF) card standards may be used as the interfaces and connectors. In such a case, various communication cards such as a local area network (LAN) card, a modem card, a universal serial bus (USB) card, an Institute of Electrical and Electronics Engineers (IEEE) 1394 card, a P1284 card, a small computer system interface (SCSI) card, and a personal handyphone system (PHS) are connected. According to this configuration, image data and management information attached to the image data can be transmitted and received between other peripheral devices such as a computer and a printer.

The optical finder 104 is a window for confirming an object to be captured without using the electronic viewfinder function of the image display unit 28. A part of the functions of the display unit 54 including an indication of in-focus state, a camera shake warning, a flash charge state, a shutter speed, an aperture value, and exposure correction are displayed inside the optical finder 104.

The communication unit 110 includes various communication functions such as Recommended Standard (RS) 232C, USB, IEEE 1394, P1284, SCSI, modem, LAN, and wireless communication.

The connector (antenna) 112 connects the imaging apparatus 100 with other devices via the communication unit 110. The connector 112 functions as an antenna when performing wireless communication.

The recording media 200 and 210 such as the memory card or the hard disk are detachably attached to the imaging apparatus 100. The recording media 200 and 210 include recording units 202 and 212 configured by a semiconductor memory or a magnetic disk, and interfaces 204 and 214 respectively. Further, the recording media 200 and 210 includes connectors 206 and 216 for connecting with the imaging apparatus 100.

Figure 2:
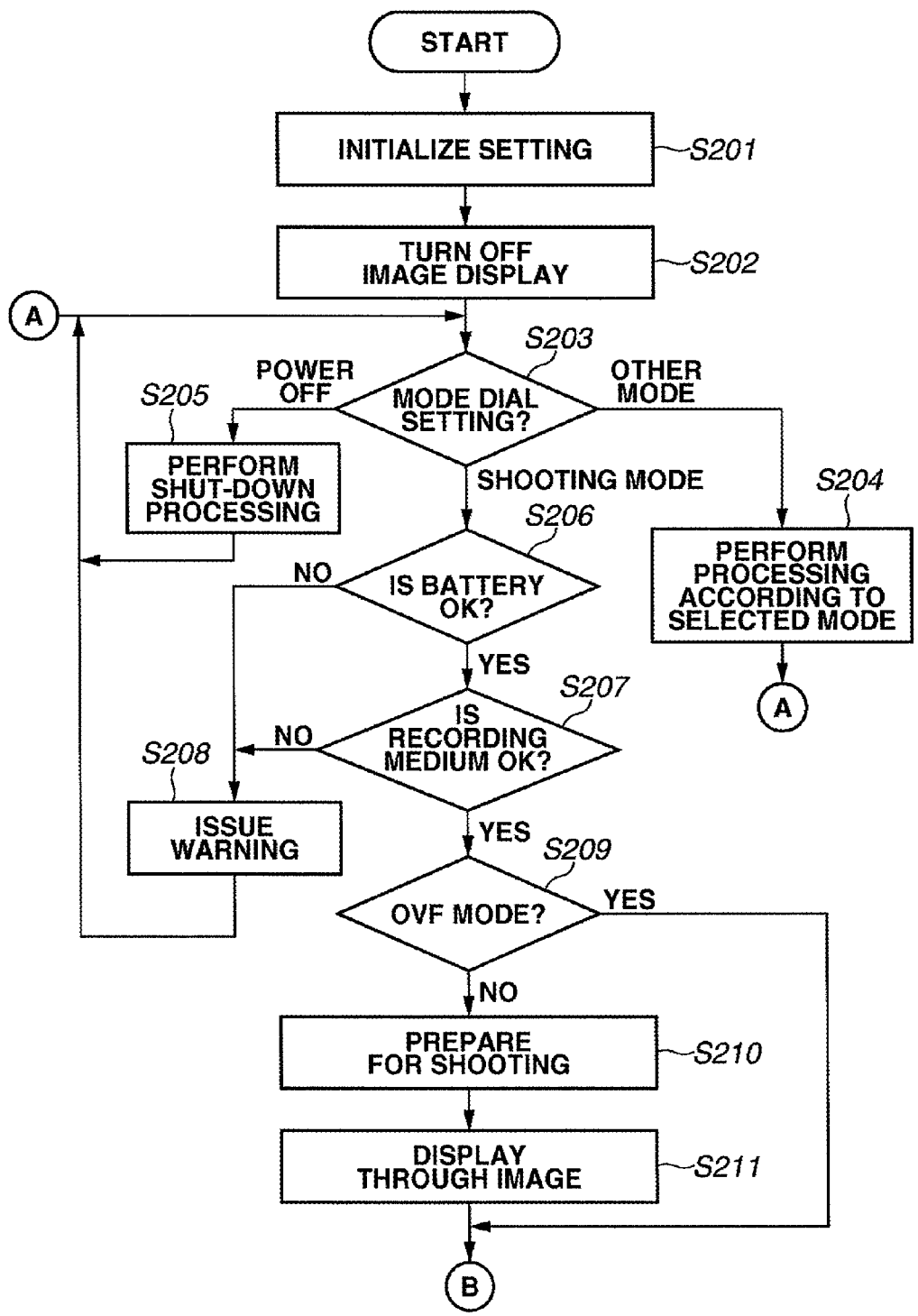
FIG. 2 is a flowchart illustrating an operation of an image capturing device.

The processing performed before the imaging apparatus captures an image will be described below with reference to FIG. 2. The processing is started by switching on the imaging apparatus 100, for example, by changing the battery.

In step S201, the system control unit 50 initializes flags and control variables. In step S202, the system control unit 50 initializes the image display unit 28 to a display off state.

In step S203, the system control unit 50 determines whether the mode dial 60 is set to a power supply off position, a shooting mode position, or other mode position. If the mode dial 60 is set to the power supply off position (POWER OFF in step S203), the processing proceeds to step S205.

In step S205, the system control unit 50 ends displaying on each display unit and closes the barrier of the protection unit 102 to protect the imaging unit. Further, the system control unit 50 records necessary parameters and setting values including the flags and the control variables, and setting modes in the non-volatile memory 56. Furthermore, the power supply control unit 80 performs predetermined shut down processing, such as shutting down unnecessary power supplies of each of the units in the imaging apparatus 100 including the image display unit 28. The processing then returns to step S203.

If the mode dial 60 is set to other mode position in step S203 (OTHER MODE in step S203), the processing proceeds to step S204. In step S204, the system control unit 50 executes the processing according to the selected mode. The processing then returns to step S203. Further, if the mode dial 60 is set to the shooting mode in step S203 (SHOOTING MODE in step S203), the processing proceeds to step S206.

In step S206, the system control unit 50 determines, using the power supply control unit 80, whether the remaining amount or the operating state of the power supply 86 may cause adverse effects on the operation of the imaging apparatus 100. If there is a problem with the power supply (NO in step S206), the processing proceeds to step S208. In step S208, the system control unit 50 outputs a predetermined warning with an image or sound using the display unit 54, and the processing returns to step S203. On the other hand, if there is no problem (YES in step S206), the processing proceeds to step S207.

In step S207, the system control unit 50 determines whether the operating state of the recording media 200 and 210 may cause adverse effects on the operation of the imaging apparatus 100, particularly, on the operation for recording or reproducing the image data thereto or therefrom. If there is a problem with the recording media 200 and 210 (NO in step S207), the processing proceeds to step S208 in which the above-described predetermined warning is output, and the processing then returns to step S203. If there is no problem (YES in step S207), the processing proceeds to step S209.

In step S209, the system control unit 50 determines whether the finder mode is set to an optical view finder (OVF) mode, or more specifically, whether the finder mode is set to the OVF mode or an electronic view finder (EVF) mode.

The OVF mode is a mode for confirming the object to be shot using the optical finder 104. On the contrary, the EVF mode is a mode for confirming the object to be shot by displaying a through-the-lens image on the image display unit 28 as the finder function. The through-the-lens image is a moving image captured by the image sensor 14 before and after shooting the still image.

Figure 3:
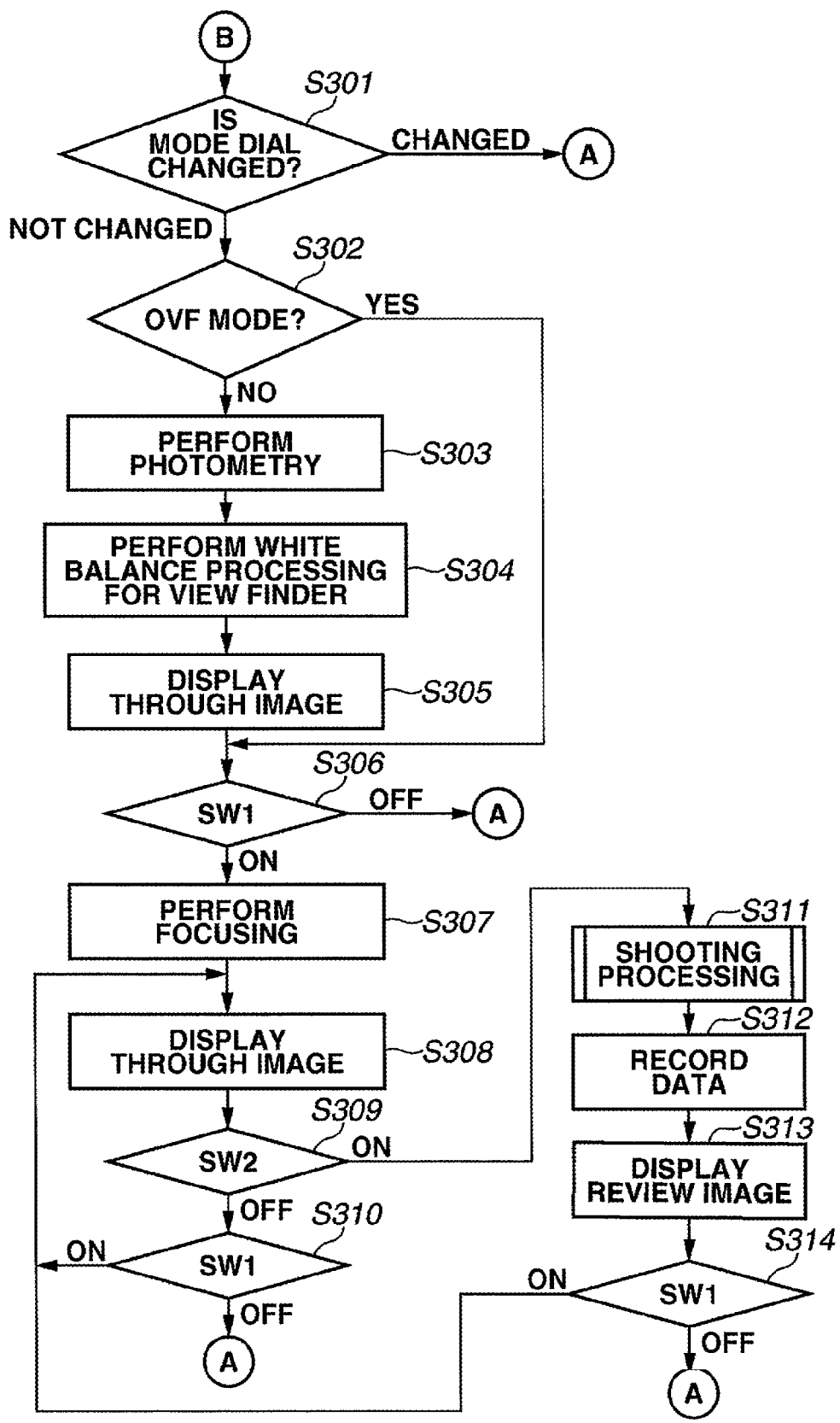
FIG. 3 is a flowchart illustrating an operation of an image capturing device.

If the system control unit 50 determines that the finder mode is set to the OVF mode (YES in step S209), the processing proceeds to the flowchart illustrated in FIG. 3 without displaying the through-the-lens image. On the other hand, if the system control unit 50 determines that the finder mode is set to the EVF mode (NO in step S209), the processing proceeds to step S210.

In step S210, the system control unit 50 initializes shooting preparation processing to display the through-the-lens image on the image display unit 28.

In step S211, the system control unit 50 starts display of the through-the-lens image via the image display unit 28 after completing the shooting preparation. When the through-the-lens image is displayed, the image data is sequentially written in the image display memory 24 via the image sensor 14, the A/D converter 16, the image processing circuit 20, and the memory control circuit 22. The written image data is then sequentially displayed on the image display unit 28 via the memory control circuit 22 and the D/A converter 26 to realize an electronic view finder function.

The camera operation for performing still image shooting by displaying the through-the-lens image will be described below with reference to FIG. 3.

In step S301, the system control unit 50 determines whether the mode dial 60 is changed. If the mode dial 60 is changed (YES in step S301), the processing returns to step S203 in FIG. 2. If the mode dial 60 is not changed (NO in step S301), the processing proceeds to step S302.

In step S302, the system control unit 50 determines whether the OVF mode is set, or more specifically, whether the OVF mode or the EVF mode is set. If the OVF mode is set (YES in step S302), the processing proceeds to step S306. If the EVF mode is set (NO in step S302), the processing proceeds to step S303.

In step S303, the system control unit 50 performs processing for continuing to display the through-the-lens image. For example, the system control unit 50 performs a predetermined photometry calculation on an image signal which the image processing circuit 20 acquired from the image sensor 14. The system control unit 50 then stores a calculation result in the memory 30, or performs AE processing on the through-the-lens image using the exposure control unit 40 based on the calculation result.

In step S304, the system control unit 50 performs white balance processing in the EVF mode. More specifically, the system control unit 50 performs a predetermined white balance calculation on the image signal that the image processing circuit 20 acquired from the image sensor 14 and stores the calculation result in the memory 30. The system control unit 50 then sets a white balance control value on the image processing circuit 20 based on the calculation result and performs the white balance processing on the through-the-lens image.

In step S305, the system control unit 50 displays on the image display unit 28 the through-the-lens image on which white balance processing has been performed.

In step S306, the system control unit 50 determines whether a user pressed the shutter switch (SW1) 61. If the user has not pressed the shutter switch (SW1) 61 (OFF in step S306), the processing returns to step S203 in FIG. 2. If the user pressed the shutter switch (SW1) 61 (ON in step S306), the processing proceeds to step S307.

In step S307, the system control unit 50 performs a predetermined focusing calculation on the image signal that the image processing circuit 20 acquired from the image sensor 14 and stores the calculation result in the memory 30. The system control unit 50 then performs AF processing based on the calculation result by the focusing control unit 42 and adjusts an in-focus point of the photographic lens 10 on the object.

In step S308, the system control unit 50 displays the through-the-lens image on the image display unit 28.

In step S309, the system control unit 50 determines whether the user pressed the shutter switch (SW2) 62. If the user has not pressed the shutter switch (SW1) 62 (OFF in step S306), the processing proceeds to step S310. In step S310, the system control unit 50 determines whether the user pressed the shutter switch (SW1) 61. If the user has not pressed the shutter switch (SW1) 61 (OFF in step S310), the processing returns to step S203 in FIG. 2. If the user pressed the shutter switch (SW1) 61 (ON in step S310), the processing returns to step S308.

If the user pressed the shutter switch (SW2) 62 (ON in step S309), the processing proceeds to step S311.

In step S311 to step S313, the system control unit executes the still image shooting process in which a series of shooting operations is performed.

In step S311, the system control unit 50 performs the still image shooting processing. In step S312, the system control unit 50 writes the compressed image data stored in the memory 30 in step S311 into the storage medium 200 as a still image file. In step S313, the system control unit 50 displays the image data shot in step S311 as an image on the image display unit 28 and ends the still image shooting processing.

In step S314, the system control unit 50 determines whether the user pressed the shutter switch (SW1) 61. If the user pressed the shutter switch (SW1) 61 (ON in step S314), the processing returns to step S308, and the system control unit 50 display the through-the-lens image and returns to a shooting standby state. If the user has not pressed the shutter switch (SW1) 61 (OFF in step S314), the processing returns to step S203 in FIG. 2.

Figure 4:
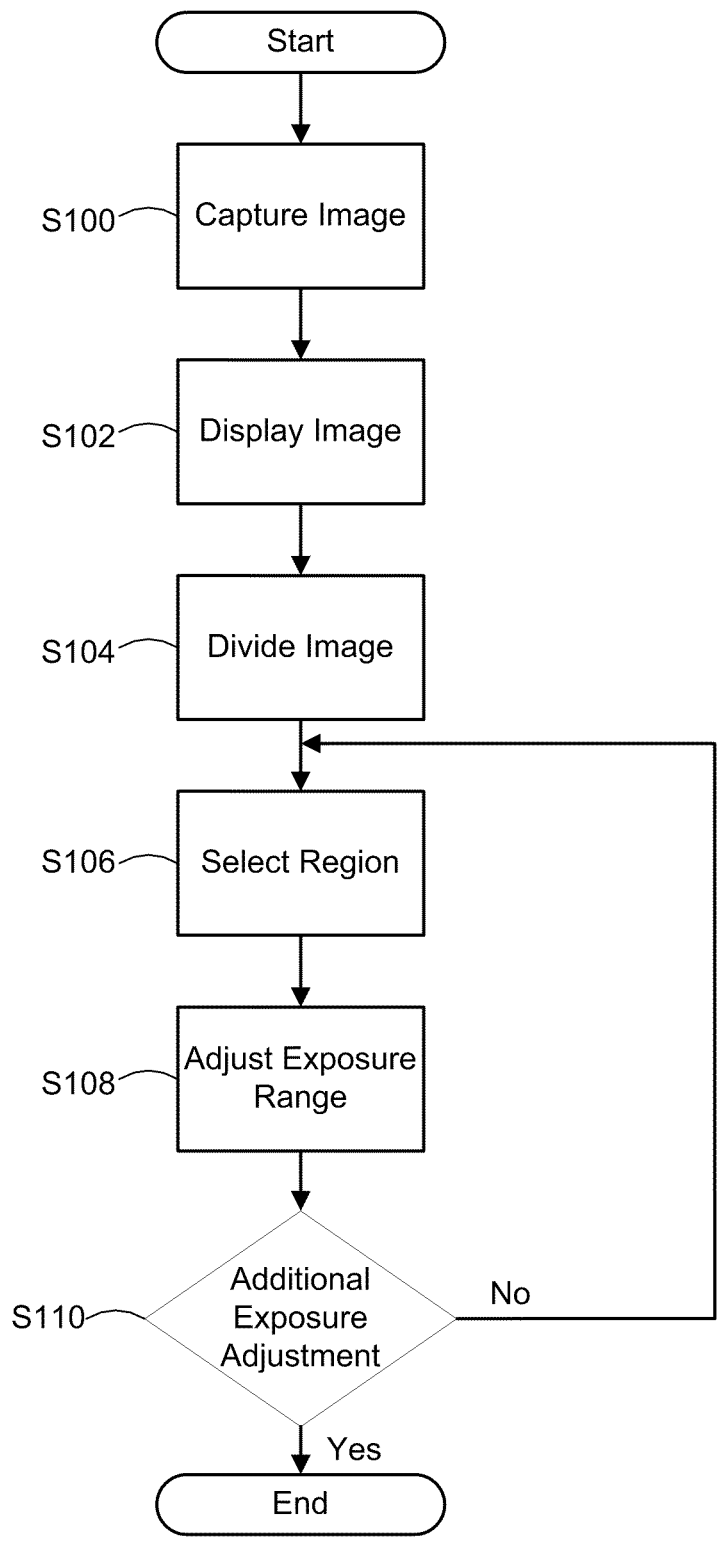
FIG. 4 is a flowchart of an operation for selective exposure adjustment in an image capturing device according to an exemplary embodiment.

FIG. 4 is a flowchart illustrating an operation for selective exposure adjustment of an image on an image-capturing device according to an exemplary embodiment.

The processing performed for selective exposure adjustments before the image captured by the image-capturing device 100 is written onto the recording media 200 will be described below with reference to FIG. 4. The processing is started by capturing an image in step S100 using the image-capturing device 100, for example, by directing the lens 10 toward a scene such that the scene is displayed on the image display unit 28 as provided in the following step S102. The image is captured and displayed on the image display unit 28 before the shutter switch (SW2) 62 is switched on by a full stroke of the shutter button by a user of the image-capturing device 100.

The system control unit 50 starts display of the through-the-lens image via the image display unit 28 after completing the shooting preparation. When the through-the-lens image is displayed, the image data is sequentially written in the image display memory 24 via the image sensor 14, the A/D converter 16, the image processing circuit 20, and the memory control circuit 22. The written image data is then sequentially displayed on the image display unit 28 via the memory control circuit 22 and the D/A converter 26 to realize an electronic view finder function.

Still referring to FIG. 4, the next step in the flow chart is step S104 dividing the image that is displayed on the image display unit 28 of the image-capturing device 100. The image displayed is divided into a plurality of regions. The user of the image-capturing device may select the quantity of regions to divide the displayed image. The number of regions the image is divided into is adjustable by the user. The advantage of being able to decide how many regions the image displayed will be divided into, is the ability to divide the image according to the different illuminants associated with the scene that is captured. For example, if the displayed image includes two different illuminat, the user may divide the image into two regions. In another case, the displayed image may include three different illuminants; the user may divide the image into three regions. From a practical standpoint, the user may typically divide the image between two to six regions, depending on the color balance goals of the user and the various illuminant associated with the displayed image. Additionally, the user may adjust the size of the regions relative to the image displayed.

The system control unit 50 allows the user to divide the image into a plurality of regions and adjust the size of the regions if desired. The system control unit 50 receives instructions from the operation unit 63 to control the division of the image. The operation unit 63 receives inputs from the user. The user may provide various inputs and instructions to the operation unit 63 by buttons associated with the operation unit 63 and/or a touch screen on the image display unit 28 by way of example and not of limitation.

In step S106, the user selects a region from the plurality of regions that were created when the image was divided in the image display unit 28 of the previous step S104. If the image displayed was divided into two regions, then the user chooses one region from the two regions. If the image displayed was divided into three regions, the user selects one region from the three regions, and so on. The region may be selected by the user through an input via a button associated with the operation unit 63 which is then relayed to the system control unit 50. The user may also select the region by contacting the region of the image displayed on the image display unit 28 where the image display unit 28 is a touch screen.

Subsequent to the region being selected in step S106, an exposure value of the selected region is adjusted according step S108. The system control unit 50 controls the exposure value of the selected region after the image-capturing device 100 receives an input from the user via the operation unit 63 or the image display unit 28. Therefore, based on the user's input, an instruction is relayed to the system control unit 50 to adjust the exposure value of the selected region to be adjusted in accordance with the user's desires. This is advantageous, because the user may specify the exposure value associated with a specific region of the image displayed on the image display unit 28 rather than having to make a global exposure adjustment to the entire image displayed on the image display unit 28. The user may adjust the exposure value for the selected region from a broad range of exposure values.

The user may select an exposure value based on various criteria. For example, the user may select an exposure value based on aesthetic concerns. The user, by selecting a particular region to adjust the exposure value, has the option to input a particular exposure value based on the user's goals. The exposure value selected by the user does not have to be correct nor does it have to take into consideration the aesthetic qualities of the image. The advantage is that the user has the ability to make exposure value selections for the selected region based on the user's preferences. An experienced photographer that is trying to achieve a particular aesthetic look may choose an exposure value for the region that normally would not be associated with an exposure value typically associated with a particular scene.

In the following step S110, the system control unit determines whether exposure adjustments have been completed. The system control unit 50 may determine if the exposure adjustments have concluded in a few different ways. The system control unit 50 can determine that the user has finished adjusting exposure values based on user input to the operation unit 63 or image display unit 28. When the system control unit 50 determines that exposure adjusting is not completed, the process proceeds by returning to step S106 where the user selects another region. Thus, for the example where the user divided the image into three regions, after adjusting the exposure value for one region, the user may continue by adjusting the exposure value of the second region, and possibly the third region. After all the regions have been selected or after a select quantity of regions have been selected and adjusted for exposure by the user, the process for selective exposure adjustments by the user through instructions directed to the system control unit 50 concludes.

Figure 5A:
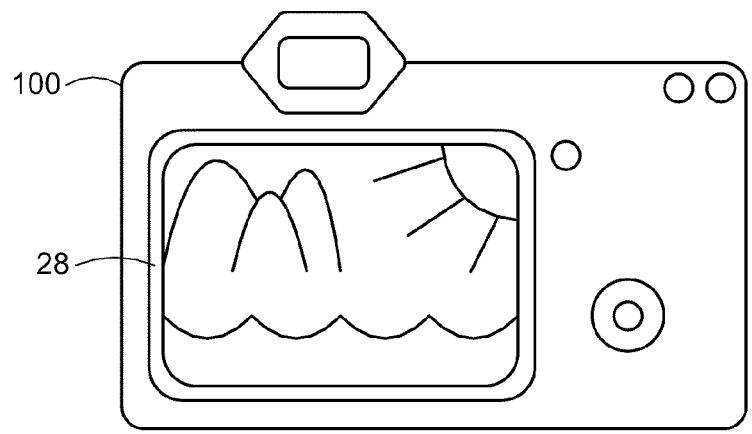
FIG. 5A illustrates an image being displayed on a display unit of the image-capturing device of FIG. 1.

Referring now to FIG. 5A, a rear view of an image-capturing device 100 with an image display unit 28 is provided. The image captured by the image-capturing device 100 and displayed on the image display unit 28 may include areas where the preferable exposure value may vary widely. For an image such as the one displayed, adjusting the exposure value globally may result in certain areas of the image where the luminance looks incorrect or not pleasing from an aesthetic point of view.

Figure 5B:
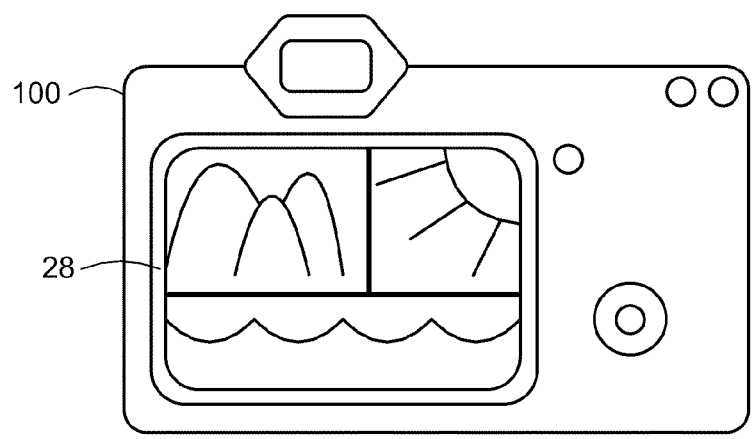
FIG. 5B illustrates an image of FIG. 5A being divided into a plurality of regions.

Referring now to FIG. 5B, the image displayed on the image display unit 28 has been divided into a plurality of regions. In particular, the image has been divided into three regions. In this example, the regions are not the same size, however, it is possible to divide the image into regions of equal size depending on the user's preference with respect to a particular image. In one region of the image, a landscape of mountains in the background is displayed. In another region, the sun is displayed. In a third region, a body of water is displayed. The user controlling the image-capturing device 100 may view the image displayed in the image display unit 28 as shown in FIG. 5A and decide that the exposure values for three different areas of the image should be adjusted. Through user inputs, the image is divided into three regions for the user to select and adjust the exposure values.

Figure 5C:
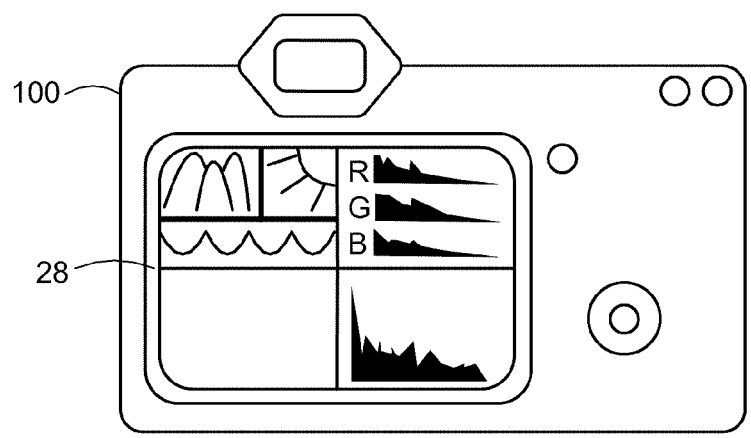
FIG. 5C illustrates a light intensity histogram being displayed on the display unit subsequent to a region from FIG. 3B being selected.

Referring now to FIG. 5C, the image display unit 28 provides a user interface for selectively adjusting the exposure values of the various regions of the image. The image display unit 28 may include a light intensity histogram as shown in FIG. 5C. The light intensity histogram allows the user to select the appropriate exposure value for each region that the user intends on adjusting the light intensity value. The light intensity histogram displayed on the image-display unit 28 provides a part of the user interface which simplifies the user's ability to adjust exposure values of regions selected by the user. After selecting one of the regions and entering an exposure value for the selected region, the user may then select a different region on the image display unit 28. The light intensity is typically encoded as a luminance.

Figure 6:
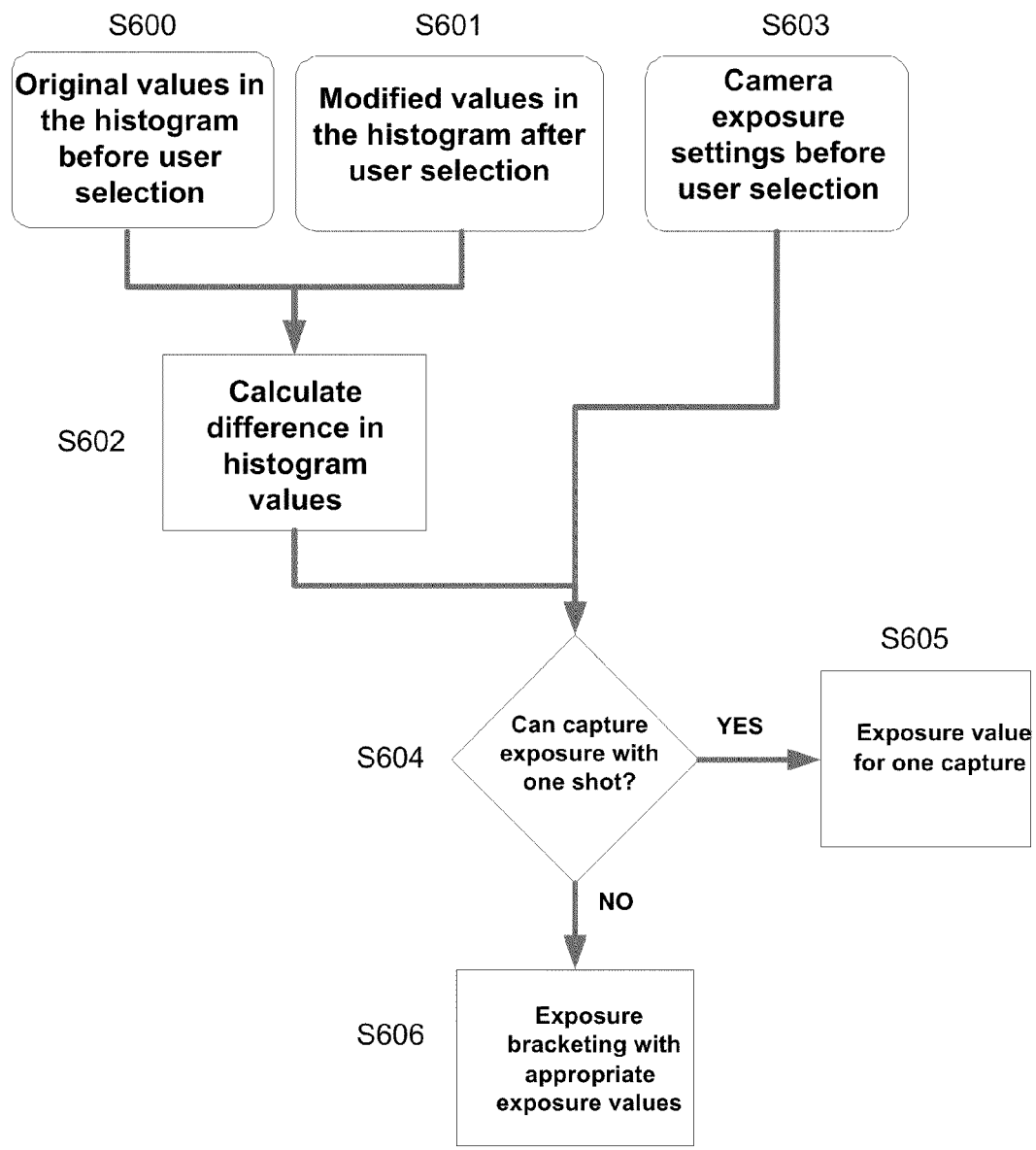
FIG. 6 is a flowchart illustrating whether the image-capturing device may capture the image using one shot based on exposure value adjustments made to the image.

FIG. 6 is a flowchart illustrating whether the image-capturing device may capture the image using one shot based on exposure value adjustments made to the image. More specifically, FIG. 6 illustrates the processing of the system control unit 50 after exposure values have been adjusted by the user for the plurality of regions on the image display unit 28.

Turning to FIG. 6, in step S602, the system control unit 50 calculates a difference in histogram values. More specifically, the system control unit 50 obtains the original or default histogram values (S600) stored in memory of the image-capturing device 100 and the histogram values modified by the user (S601). Then, the system control unit 50 calculates the difference between the two values.

Next, in step S604, the system control unit uses the calculated histogram value difference and the image-capturing device's 100 default exposure values to determine whether the desired image can be captured with one capture. If it is determined that the desired can be captured with one capture, then in step S605, the desired image is captured and stored on the recording medium 200. If it is determined that the desired image cannot be captured with one capture, then in step S606, multiple captures are used to capture the desired image. By capturing the image with multiple captures, exposure bracketing with appropriate exposure values is enabled.

The image-capturing device 100 of the above described embodiment provides the user with the ability to selectively adjust exposure values instead of just globally. The user interface associated with image-capturing device 100 allows the user to view the image, divide the image into regions, and then adjust the exposure values of each region on an individual basis in order to obtain a desired exposure value. By performing exposure adjustments before an image is captured, the captured image is stored with these adjustments, thus enabling the user to make the changes without having to do them in a post-processing environment.

It is to be understood that the above described features can be achieved by a method in which a storage medium is supplied to a system or device, the storage medium having computer-executable process steps for realizing the above described functions, and a computer (CPU or MPU) for the system or device that reads the computer-executable process steps stored in the storage medium and executes them.

In this case, the computer-executable process steps read from the storage medium executes the functions of the above described embodiments. Thus, the computer-executable process steps or the storage medium storing the computer-executable process steps therein constitute the present invention.

As a storage medium for supplying the computer-executable process steps, for example, a floppy disk, a hard disk, an optical disk, a magneto-optical disk, a CD-ROM, a CD-R, a magnetic tape, a non-volatile memory card, a ROM, any other applicable computer-readable storage medium can be employed.

When the computer-executable process steps read by the computer are executed, not only are the above described functions of the embodiments realized, but also an operating system working on the computer may carry out part or all of the actual processing that realizes the functions of the above described embodiments.

The computer-executable process steps read from the computer-readable storage medium may be written to a memory provided on a function-extension board inserted into the computer, of a function-extension unit connected to the computer, and a CPU provided on the function-extension board or unit carries out part of all of the actual processing that realizes the functions of the above described embodiments.

While the invention is described above with respect to what is currently its exemplary embodiment, it is to be understood that the invention is not limited to that described above. To the contrary, the invention is intended to cover various modifications and equivalent arrangements within the spirit and scope of the appended claims.

What is claimed is:

1. An image-capturing device comprising:
    an image sensing unit configured to acquire a first image of a scene;
    a display unit configured to display the first image of the scene;
    a dividing unit configured to receive a user selection of a quantity of regions and divide the scene into a plurality of regions according to the user selection of the quantity of regions;
    an exposure control unit configured to receive a user selection of a first level of exposure for a first region of the plurality of regions, and receive a user selection of a second level of exposure for a second region of the plurality of regions; and
    a control unit configured to adjust a level of exposure of the first region to the user selected first level of exposure and adjust a level of exposure of the second region to the user selected second level of exposure,
    wherein the exposure control unit calculates a difference between values in a first luminance histogram, which indicates luminance histogram values before the level of exposure of the first region and the level of exposure of the second region are adjusted, and values in a second luminance histogram, which indicates luminance histogram values after the level of exposure of the first region and the level of exposure of the second region are adjusted, and
    wherein the control unit is configured to instruct the image sensing unit to select between capturing an image of the scene in one capture and capturing an image of the scene in multiple captures according to the calculated difference.

2. The image-capturing device according to claim 1, wherein a user selects at least one region on the display unit.

3. The image-capturing device according to claim 2, wherein a luminance histogram is displayed on the display unit subsequent to the user selecting the region.

4. The image-capturing device according to claim 3, wherein the level of exposure of a selected region is adjusted by modifying the luminance histogram in accordance with an instruction from the user.

5. The image-capturing device according to claim 4, wherein the instruction from the user is received from a slider control associated with the luminance histogram.

6. The image-capturing device according to claim 4, wherein the instruction from the user is received via an operation unit of the image-capturing device.

7. The image-capturing device according to claim 1, wherein the display unit displays a luminance histogram corresponding to each of the plurality of regions displayed on the display unit.

8. The image-capturing device according to claim 1, wherein the exposure control unit is further configured to determine respective exposure values based on the first level of exposure and the second level of exposure.

9. The image-capturing device according to claim 1, wherein the number of the plurality of regions is adjustable and the size of the plurality of regions is adjustable.

10. A method for selective exposure adjustments on an image capturing device, the method comprising:
- displaying a first image of a scene to be captured by the image-capturing device;
- receiving a user selection of a quantity of regions into which the displayed scene is to be divided;
- dividing the displayed scene into a plurality of regions according to the user selection of the quantity of regions and a user selection of a size of each of the plurality of regions;
- selecting a first region from the plurality of regions;
- adjusting an exposure value of the selected first region to a user selection of a first exposure value;
- selecting a second region from the plurality of regions;
- adjusting an exposure value of the selected second region to a user selection of a second exposure value;
- calculating a difference, using an exposure control unit, between values in a first luminance histogram, which indicates luminance histogram values before the exposure value of the selected first region and the exposure value of the selected second region are adjusted, and values in a second luminance histogram, which indicates luminance histogram values after the exposure value of the selected first region and the exposure value of the selected second region are adjusted; and
- selecting between capturing an image of the scene in one capture and capturing the image of the scene in multiple captures according to the calculated difference.

11. A method according to claim 10, wherein the at least one region is selected via a user interface of the image-capturing device.

12. A method according to claim 11, wherein the user selects an exposure value for at least one region.

13. A method according to claim 12, wherein the exposure value is selected by modifying a luminance histogram using a slider control associated with the luminance histogram.

14. A method according to claim 12, wherein the exposure value is selected by modifying a luminance histogram using an operation unit hardware element of the image-capturing device.

15. A method according to claim 10, wherein the exposure value is adjusted for the region before the scene is recorded onto a memory device.

16. A method according to claim 10, wherein the exposure value is adjusted for more than one region from the plurality of regions before the scene is recorded onto a memory device.

17. The image-capturing device according to claim 1, wherein the dividing unit is further configured to divide the scene into the plurality of regions according to a user selection of a size of each of the number of regions.

18. The image-capturing device according to claim 17, wherein the size of each of the plurality of regions is different from each other.

19. The image-capturing device according to claim 1, wherein the plurality of regions is contiguous.

* * * * *